(12) United States Patent
Kim et al.

(10) Patent No.: US 8,975,308 B2
(45) Date of Patent: Mar. 10, 2015

(54) UV-CURABLE COATING COMPOSITIONS WITH SELF-HEALING CAPABILITIES, COATING FILMS, AND METHODS OF PRODUCING COATING FILMS

(75) Inventors: Hye-Min Kim, Daejeon (KR); Yeong-Rae Chang, Daejeon (KR); Heon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/990,698

(22) PCT Filed: Feb. 13, 2012

(86) PCT No.: PCT/KR2012/001060
§ 371 (c)(1),
(2), (4) Date: May 30, 2013

(87) PCT Pub. No.: WO2012/111947
PCT Pub. Date: Aug. 23, 2012

(65) Prior Publication Data
US 2013/0261209 A1 Oct. 3, 2013

(30) Foreign Application Priority Data

Feb. 14, 2011 (KR) .................. 10 2011 0012781
Feb. 10, 2012 (KR) .................. 10 2012 0013943

(51) Int. Cl.
| | |
|---|---|
| *C08F 2/50* | (2006.01) |
| *B29C 71/04* | (2006.01) |
| *C08F 2/46* | (2006.01) |
| *C08G 61/04* | (2006.01) |
| *C09D 175/14* | (2006.01) |
| *C09D 7/12* | (2006.01) |
| *C08G 18/75* | (2006.01) |
| *C08G 18/10* | (2006.01) |
| *C09D 175/16* | (2006.01) |
| *C08G 18/42* | (2006.01) |
| *C08G 18/67* | (2006.01) |
| *C08G 18/76* | (2006.01) |
| *C08G 18/79* | (2006.01) |

(52) U.S. Cl.
CPC ............ *C09D 175/14* (2013.01); *C09D 7/1225* (2013.01); *C08G 18/755* (2013.01); *C08G 18/10* (2013.01); *C09D 175/16* (2013.01); *C08G 18/4277* (2013.01); *C08G 18/6725* (2013.01); *C08G 18/7621* (2013.01); *C08G 18/792* (2013.01); *C08G 18/672* (2013.01)
USPC .................. 522/33; 522/6; 522/71; 522/189; 522/184; 522/1; 520/1

(58) Field of Classification Search
CPC .............. C09D 175/14; C09D 7/1225; C08K 2003/023
USPC ................... 522/33, 6, 1, 71, 189, 184; 520/1
See application file for complete search history.

(56) References Cited

U.S. PATENT DOCUMENTS

| | | | |
|---|---|---|---|
| 5,695,851 A | 12/1997 | Watanabe et al. | |
| 6,355,703 B1 * | 3/2002 | Baba et al. ............. | 522/182 |
| 2009/0076198 A1 * | 3/2009 | Giesenberg et al. ............ | 524/82 |
| 2011/0256322 A1 * | 10/2011 | Outlaw et al. ................. | 427/503 |

FOREIGN PATENT DOCUMENTS

| | | |
|---|---|---|
| EP | 1544857 A1 | 6/2005 |
| EP | 2261289 A1 | 12/2010 |
| JP | 08-283606 | 10/1996 |
| JP | 2002-067238 | 3/2002 |
| JP | 2005-099778 | 4/2005 |
| JP | 2006290696 A | 10/2006 |
| JP | 2008150484 A | 7/2008 |
| JP | 2010254840 A | 11/2010 |
| KR | 10-0377042 | 8/2003 |
| KR | 10-2006-0113955 A | 11/2006 |
| KR | 10-2009-0056913 | 6/2009 |
| KR | 10-2010-0026014 | 3/2010 |
| WO | WO 95/21220 | 8/1995 |
| WO | 2008039228 A1 | 4/2008 |
| WO | 2009069974 A2 | 6/2009 |

* cited by examiner

*Primary Examiner* — Ling Choi
*Assistant Examiner* — Jessica E Whiteley
(74) *Attorney, Agent, or Firm* — McKenna Long & Aldridge, LLP

(57) ABSTRACT

The present invention is directed to a coating composition including a (meth)acrylate binder resin, a UV initiator, an organic solvent, and silica particles surface-treated with a (meth)acrylate compound, a coating film including a cured product of the coating composition, and a method of producing the coating film. The present invention makes it possible to provide a coating material having high transmittance and a low level of haze, and excellent scratch resistance and self-healing capabilities.

19 Claims, No Drawings

UV-CURABLE COATING COMPOSITIONS WITH SELF-HEALING CAPABILITIES, COATING FILMS, AND METHODS OF PRODUCING COATING FILMS

This application is a National Stage Entry of International Application No. PCT/KR2012/001060, filed Feb. 13, 2012, and claims priority to and the benefit of Korean Patent Application Nos. 10-2011-0012781, filed Feb. 14, 2011, 10-2012-0013943, filed Feb. 10, 2012, the disclosures of which are incorporated herein by reference in their entirety.

TECHNICAL FIELD

The present invention is directed to UV-curable coating compositions with self-healing capabilities, coating films, and methods of producing coating films. More specifically, the present invention is directed to a UV-curable coating composition having high transmittance and a low level of haze, excellent scratch resistance and self-healing capabilities, a coating film prepared from the coating composition, and a method of producing the coating film.

BACKGROUND OF THE ART

Different coating layers or coating films are applied to the surfaces of electronic devices such as mobile phones, electronic material parts, home appliances, exterior or interior parts for vehicles, and plastic molded products, for the purpose of protecting the products from damage caused by mechanical, physical, or chemical influences from the outside. As scratches occurring on the surface of the product coatings or cracks resulting from external impacts may lead to deterioration of external appearance and main performance of the products and shorten their lifespan, considerable researches have been conducted to protect the surface of the product and thus maintain long-term quality thereof.

Recently, vigorous studies have been underway on coating materials with self-healing capabilities since such materials require no additional coatings and no repairs when being damaged on a surface and have substantial advantages in maintaining external appearance and product performance. Actually, such studies have reported a UV-curable composition using an oligomer demonstrating self-healing capabilities and a composition including inorganic particles or fluorine compounds added therein so as to enhance scratch resistance and stain resistance. However, coating materials obtained from the aforementioned compositions have drawbacks that they can neither have a high level of surface hardness nor show sufficient self-healing capabilities.

Also disclosed were a coating composition including polymers or polymer active substances, or having particles or capsules surface-treated with the polymers and the like. Coating layers made from such compositions demonstrates self-healing capabilities to some extent for the cracks caused by an external impact, but they still have drawbacks such as unsatisfactory mechanical properties including scratch resistance or durability and poor compatibility between the components.

DETAILED DESCRIPTION OF THE INVENTION

Technical Objectives

The present invention s provides a UV-curable coating composition having high transmittance, a low level of haze, and excellent scratch resistance and self-healing capabilities.

Further, the present invention provides a coating film prepared by using the coating composition.

Further, the present invention provides a method of producing the coating film.

Technical Solution

The present invention provides a coating composition, which includes a (meth)acrylate binder resin, a UV initiator, an organic solvent, and silica particles surface-treated with a (meth)acrylate compound.

In addition, the present invention provides a coating film including a cured product of the coating composition.

Further, the present invention provides a method of producing a coating film, which includes the steps of mixing a (meth)acrylate binder resin, a UV initiator, an organic solvent, and silica particles surface-treated with a (meth)acrylate compound, applying the mixture to a substrate and drying it, and subjecting the dried mixture to UV curing.

More detailed explanations as to the UV-curable coating compositions, the coating films, and the production method of the coating films according to specific embodiments of the present inventions will be presented hereinbelow.

As used herein, the term "(meth)acrylate" is intended to include both methacrylate and acrylate.

According to an embodiment of the present invention, a coating composition including a (meth)acrylate binder resin, a UV initiator, an organic solvent, and silica particles surface-treated with a (meth)acrylate compound is provided.

The present inventors have discovered the following from experimentation and completed the present invention: a coating composition obtained by adding silica particles surface-treated with a (meth)acrylate compound to a (meth)acrylate binder resin can be used to produce a coating material with high transmittance and a low level of haze, an excellent level of scratch resistance, and self-healing capabilities.

In particular, the coating composition employs a highly flexible (meth)acrylate binder resin to extend spaces existing in the polymer network of the crosslinked structure and increase elasticity, thereby imparting enhanced self-healing capabilities to the coating materials thus obtained. Furthermore, including the silica particles surface-treated with the (meth)acrylate compound in the coating composition results in a more compact crosslinked structure of the coating material thus obtained, thereby making it possible to enhance wear resistance and film strength and to prevent the coating material from being permanently damaged by large external forces or impacts and thus losing its self healing capabilities.

The silica particles surface-treated with the (meth)acrylate compound are highly compatible with the (meth)acrylate binder resin, and may form chemical bonds through a UV curing process and play a role of a crosslinking point for the components in the coating material to increase scratch resistance and self-healing capabilities thereof. The (meth)acrylate compound bonded to the surface of the silica particles may undergo a reaction with the (meth)acrylate binder resin under UV irradiation, acting to chemically link the silica particles and the binder resins.

Typically, since the silica particles themselves have poor compatibility with a (meth)acrylate binder resin, they would be either segregated when being mixed in the coating composition (or the coating material) or partly aggregated in the coating composition (or the coating material). On the contrary, the silica particles surface-treated with the (meth)acrylate compound become highly compatible with the (meth)acrylate binder resin so that they can be uniformly mixed with the other components in the composition or the coating film.

In the silica particles being surface-treated with the (meth)acrylate compound, the (meth)acrylate compound can be bonded to the surface of the silica particles through a physical or chemical bond, preferably via a urethane linkage. In other words, the silica particles surface-treated with the (meth) acrylate compound may include silica particles having a (meth)acrylate compound bonded on its surface through a urethane linkage.

With the (meth)acrylate compound being linked to the surface of the silica particles via the urethane linkage, the chemical properties of the urethane linkage may bring about an increase in elasticity of the coating material thus obtained and more extended spaces present in the polymer network of the crosslinked structure in a final coating film or coating body to realize more enhanced self-healing capabilities. In addition, the (meth)acrylate compounds being bonded to the surface of the silica particles via the urethane linkage make the silica particles have enhanced compatibility, allowing them to be uniformly mixed with other components in the composition or the coating film.

The (meth)acrylate compounds to be bonded to the surface of the silica particles may include a urethane (meth)acrylate resin or a hydroxyalkyl (meth)acrylate modified with a polylactone compound. Preferably, the silica particles surface-treated with a (meth)acrylate compound may include silica particles surface-treated with a polylactone-modified hydroxyalkyl (meth)acrylate, and more preferably, silica particles having a polycaprolactone-modified hydroxyalkyl (meth)acrylate linked to its surface via a urethane linkage.

The polylactone compound may be a compound derived from a C3 to C10 cyclic ester, and preferably, a compound derived from a C4 to C8 cyclic ester, and more preferably a C6 cyclic ester. Accordingly, the polylactone-modified hydroxyalkyl (meth)acrylate compound may be a hydroxyalkyl (meth)acrylate compound having a polylactone compound linked to its end.

Specifically, the silica particles having a polylactone-modified hydroxyalkyl (meth)acrylate linked to its surface via a urethane linkage may include a compound represented by Chemical Formula 2.

The (meth)acrylate binder resin refers to a polymer compound resin including an acrylate or methacrylate functional group, the types of which are not particularly limited. Specific examples of the (meth)acrylate binder resin include a urethane (meth)acrylate resin and a hydroxyalkyl (meth)acrylate modified with a polylactone compound, a mixture thereof, or a copolymer therebetween.

The hydroxyalkyl (meth)acrylate resin modified with a polylactone compound may include a compound of Chemical Formula 1 as follows.

[Chemical Formula 1]

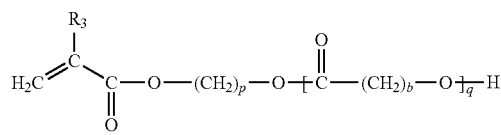

In Chemical Formula 1, $R_3$ can be hydrogen or methyl, b can be an integer of 2 to 9, p can be an integer of 1 to 5, and q can be an integer of 1 to 10. Preferably, b is an integer of 3 to 7, and more preferably, 5. Specific examples of the hydroxyalkyl (meth)acrylate resin modified with the polylactone compound include Placcel FA (acrylate) series or Placcel FM (methacrylate) series, both of which are among the product lines from Daicel Co. Ltd.

The urethane (meth)acrylate resin refers to a polymer resin including an acrylate or methacrylate functional group and a urethane linkage (CO—NH) in its molecule, and specifically, it can be a polymer resin obtained from a reaction between a (meth)acrylate compound and an organic isocyanate compound having at least two isocyanate groups per molecule.

[Chemical Formula 2]

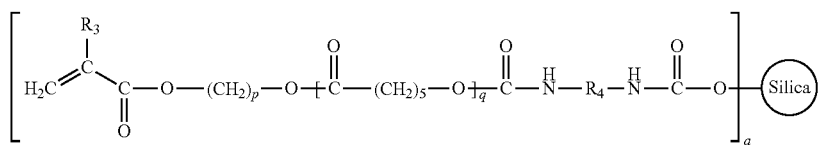

In Chemical Formula 2, $R_3$ is hydrogen or methyl, $R_4$ is any divalent organic functional group, p is an integer of 1 to 5, q is an integer of 1 to 10, a is an integer equal to or greater than 1, b is an integer of 2 to 9, and "silica" represents a silica particle. As will be described below, $R_4$ may be a divalent organic functional group derived from a diisocyanate compound. Specific examples of the diisocyanate compound are the same as will be described below. "a" may represent the number of the hydroxyalkyl (meth)acrylates modified with the polylactone compound that are linked to the surface of the silica particle via a urethane linkage, and for example, is an integer of 1 to 30. Preferably, b can be an integer of 3 to 7, and more preferably 5.

The silica particles may have an average diameter of 5 to 100 nm. Silica particles having an overly small size on average may fail to play a proper role of a crosslinking point or a support in the coating material, while those one having an overly large size on average may cause a decrease in transparency or mechanical properties of the coating material.

Preferred examples of the urethane (meth)acrylate resin include a reaction product between an organic isocyanate compound having at least two isocyanate groups per molecule and a hydroxyalkyl (meth)acrylate resin modified with a polylactone compound. As described above, specific examples of the hydroxyalkyl (meth)acrylate resin modified with the polylactone compound may include a compound of Chemical Formula 1. Specific examples of the organic isocyanate compound having at least two isocyanate groups per molecule are not particularly limited, and for example, may include any of diisocyanate compounds and polyisocyanate compounds having at least three isocyanate groups obtained by modification of the diisocyanate compound. Examples of the modification method for the diisocyanate compound include an isocyanurate modification, a trimethylol propane modification, a biuret modification, and the like.

Specifically, preferred examples of the urethane (meth) acrylate resin include a compound of Chemical Formula 5 as follows.

[Chemical Formula 5]

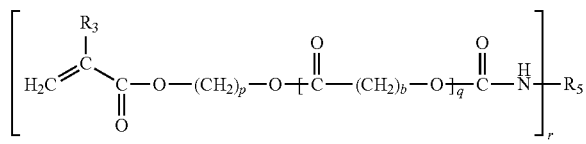

In Chemical Formula 5, $R_3$ is hydrogen or a methyl, p is an integer of 1 to 5, b is an integer of 2 to 9, and q is an integer of 1 to 10. Further, r, representing the number of the isocyanate groups in the organic isocyanate compound as used, may be, for example, an integer of 2 to 10, and preferably 2 to 6. $R_5$ is an r-valent functional group derived from the organic isocyanate compound. Preferably, b can be an integer of 3 to 7, and more preferably 5.

The coating composition may include an organic solvent. Any organic solvent known in the art to be available for the coating composition may be employed without any particular limitation. For example, one may use a ketone organic solvent such as methyl isobutyl ketone, methyl ethyl ketone, dimethyl ketone, and the like; an alcohol organic solvent such as isopropyl alcohol, isobutyl alcohol, and normal butyl alcohol; an acetate organic solvent such as ethyl acetate, normal butyl acetate, and the like; or a cellosolve organic solvent such as ethyl cellosolve, butyl cellusolve, and the like. However, the organic solvent is not limited to the aforementioned ones.

In addition, the coating composition may include a UV initiator. Any known UV initiator typically available in the art may be utilized with no particular limitations. For example, one may use a benzophenone compound, an acetophenone compound, a biimidazole compound, a triazine compound, an oxime compound, or a mixture thereof. Specific examples of the UV initiator include benzophenone, benzoyl methyl benzoate, acetophenone, 2,4-diethyl thioxanthone, 2-chloro thioxanthone, ethyl anthraquinone, 1-hydroxy-cyclohexyl-phenyl-ketone, Irgacure 184 marketed by Ciba Co., Ltd., and 2-hydroxy-2-methyl-1-phenyl-propan-1-one.

The coating composition may include 20% to 80% by weight of a (meth)acrylate binder resin; 1% to 10% by weight of a UV initiator; 5% to 50% by weight of an organic solvent; and 1% to 30% by weight of a silica particle surface-treated with a (meth)acrylate compound.

The coating composition may further include a UV-curable monomer. The UV-curable monomer may act as an interpolymeric crosslinker under UV irradiation, enhance workability of the coating composition, or take a part in making an improvement in the properties of the material obtained from the coating composition. In addition, the coating composition may further include 1% to 30% by weight of the UV-curable monomer.

The UV-curable monomer may include a multifunctional acrylate compound having at least two functional groups. Specific examples of such UV-curable monomer include, but are not limited to, pentaerythritol tri/tetraacrylate (PETA), dipentaerythritol hexa-acrylate (DPHA), trimethylol propane triacrylate (TMPTA), and hexamethylene diacrylate (HDDA).

In addition, the coating composition may further include an additive such as a leveling agent or a dispersion stabilizer in an amount of 0.1% to 5% by weight.

According to other embodiments of the present invention, a coating film including a cured product of the coating composition is provided.

As described above, when the silica particle surface-treated with the (meth)acrylate compound is added to a certain (meth)acrylate binder resin and then subjected to UV curing, it is possible to produce a coating material that has high transmittance, a low level of haze, excellent scratch resistance, and superior self-healing capabilities.

In particular, when curing of the coating composition, the acrylate compound being linked to the surface of the silica particles would form a chemical bond with the (meth)acrylate binder resin, and thereby the silica particles are made to play a role of a crosslinking point between the components in the coating film, improving the coating material in terms of not only mechanical properties such as scratch resistance but also self-healing capabilities.

Specifically, the coating film may include a (meth)acrylate binder resin, and silica particles surface-treated with a (meth)acrylate compound to which the binder resin is chemically bonded. A carbon-carbon double bond in the acrylate moiety of Chemical Formula 2 undergoes a reaction with a carbon-carbon double bond in the binder resin and thereby the silica particles may be chemically bonded to the binder resin. As a result, in the coating film, the acrylate binder resin and silica particles surface treated with the (meth)acrylate compound may form a crosslinked network structure.

Details of the binder resin, the UV initiator, and the silica particles being surface-treated with the (meth)acrylate compound are the same as set forth above.

A trace amount of the UV initiator may be present in the coating film. Further, a trace amount of a leveling agent or a dispersion stabilizer may optionally exist in the coating film.

The coating film may further include a UV-curable monomer. The UV-curable monomer can include a multifunctional acrylate compound with at least two functional groups, and specific examples thereof are the same as set forth above. The UV-curable monomer may be present in the coating film, as it is chemically bonded with the (meth)acrylate binder resin or the (meth)acrylate compound being introduced in the surface of the silica particle.

The coating film may be in the form of a layer built on a certain substrate, or it may be in the form of a processed film capable of being adhered or combined to a product to be applied.

According to another embodiment of the present invention, a method of producing a coating film is provided, which includes the steps of mixing a (meth)acrylate binder resin, a UV initiator, an organic solvent, and silica particles surface-treated with a (meth)acrylate compound; applying the mixture to a substrate and drying the same; and subjecting the dried mixture to UV curing.

Details of the (meth)acrylate binder resin, the UV initiator, the silica particles being surface-treated with the (meth)acrylate compound, and the organic solvent are the same as set forth above.

In the mixing step of the aforementioned components, they may be uniformly combined by using any method or apparatus commonly available for mixing the organic compounds. By way of an example, the mixture including the (meth)acrylate binder resin, the UV initiator, the organic solvent, and the silica particles being surface-treated with the (meth)acrylate compound may be combined at room temperature by using any typically used mixer or stirrer. The mixture may include 20% to 80% by weight of the (meth)acrylate binder resin; 1% to 10% by weight of the UV initiator; 5% to 50% by weight of the organic solvent; and 1% to 30% by weight of the silica particles surface-treated with the (meth)acrylate compound.

In the step of applying the mixture, one may employ any typical method or apparatus utilized for the application of the coating composition, such as Meyer bar coating, applicator coating, roll coating, and the like.

Drying the mixture as applied on the substrate may then be conducted at room temperature for around 24 hours. In addition, the drying or curing step may be fulfilled by using an arch-type oven or a floating type oven controlled at a temperature below the boiling point of the solvent as used for the mixture.

There are no particular limitations on the substrate, and for example, a PET or TAC (triacetate cellulose) substrate may be employed.

In the step of subjecting the dried mixture to UV curing, it may be irradiated with UV rays or visible rays having a wavelength of 200 to 400 nm. Under irradiation, the light intensity is preferably from 100 to 4000 mJ/cm$^2$. The irradiation time is not particularly limited and may be properly changed depending on the irradiation apparatus, the wavelength of the irradiated rays, or the light intensity.

The method of producing the coating film may further include preparing a (meth)acrylate binder resin. As described above, the types of the (meth)acrylate binder resin are not particularly limited. Specific examples of the (meth)acrylate binder resin include a urethane (meth)acrylate resin, a hydroxyalkyl (meth)acrylate resin modified with a polylactone compound, a mixture thereof, and a copolymer therebetween. Details of the urethane (meth)acrylate resin and the hydroxyalkyl (meth)acrylate resin modified with a polylactone compound are the same as previously discussed.

The step of producing the (meth)acrylate binder resin may include triggering a reaction between an organic isocyanate compound having at least two isocyanate groups per molecule and a polylactone-modified hydroxyalkyl (meth)acrylate resin to produce a urethane (meth)acrylate resin.

Specifically, the organic isocyanate compound having at least two isocyanate groups per molecule and the polylactone-modified hydroxyalkyl (meth)acrylate resin may undergo a urethane reaction, which may be accomplished by stirring the reactants at a temperature of 20 to 100° C. for 1 hour to 10 hours. Preferably, such reaction occurs in the presence of a metal catalyst such as dibutyltin dilaurate (DBTDL).

Specific examples of the polylactone-modified hydroxyalkyl (meth)acrylate resin may be a compound of Chemical Formula 1 as described above.

As previously mentioned, specific examples of the organic isocyanate compound having at least two isocyanate groups per molecule may include, but are not particularly limited to, any of a diisocyanate compound as will be described below, a polyisocyanate compound having at least three isocyanate groups prepared by modifying such diisocyanate compound, and the like. Among the modification methods for the diisocyanate compound are isocyanurate modification, trimethylol propane modification, biuret modification, and the like.

Any organic compound having at least two isocyanate groups may be used for the diisocyanate compound with no particular limitations. Specific examples thereof include ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), and diphenylmethane-4,4'-diisocyanate (MDI).

In preparation of the binder resin, besides the hydroxyalkyl (meth)acrylate resin modified with the polylactone compound, an alkyl acrylate having a hydroxy moiety may be added, and specific examples thereof include 2-hydroxyethyl (meth)acrylate, 2-hydroxypropyl(meth)acrylate, 4-hydroxybutyl(meth)acrylate, and the like.

The content of the component used in the preparation of the binder resin may be properly controlled depending on reaction conditions and the properties of the binder resin thus obtained. For example, the (meth)acrylate binder resin may be prepared by using 20% to 60% by weight of the organic isocyanate compound having at least two isocyanate groups per molecule, 20% to 60% by weight of the hydroxyalkyl (meth)acrylate resin modified with the polylactone compound, 10% to 30% by weight of a hydroxyalkyl (meth)acrylate, and 0.01% to 1% by weight of a catalyst. In this regard, the mole ratio of isocyanate/hydroxy is preferably between 0.5 and 2.

The production method of the coating film may further include a step of preparing silica particles surface-treated with a (meth)acrylate compound. The step of preparing silica particles being surface-treated with a (meth)acrylate compound may include subjecting the silica particles to a reaction with a diisocyanate compound, and subjecting a product resulting from the reaction between the silica particles and the diisocyanate compound to a reaction with a (meth)acrylate compound.

Any organic compound having two isocyanate groups may be used for the diisocyanate compound without being particularly limited, and specific examples thereof are the same as set forth above regarding the diisocyanate compound.

Subjecting silica particles to a reaction with a diisocyanate compound may be conducted by stirring the reactants at a temperature of 20° C. to 80° C. for around 24 hours, and preferably, the reaction occurs in the presence of a metal catalyst. Examples of the catalyst that can be used include metals such as platinum (Pt), ruthenium (Ru), iridium (Ir), rhodium (Rh), palladium (Pd), and tin (Sn), and any organic compounds thereof.

The silica particles and the diisocyanate compound may be mixed and react in an organic solvent, and examples of the usable organic solvent are the same as described above.

Subjecting the reaction product between the silica particles and the diisocyanate compound to a reaction with the (meth) acrylate compound may be carried out by stirring the reactants at a temperature of 20° C. to 100° C. for 1 hour to 10 hours, preferably in the presence of a metal catalyst. Examples of the available catalyst include metals such as platinum (Pt), ruthenium (Ru), iridium (Ir), rhodium (Rh), palladium (Pd), and tin (Sn), and any organic compounds thereof.

When the acrylate compound reacting with the reaction product between the silica particles and diisocyanate compound is a hydroxyalkyl (meth)acrylate resin modified with a polylactone compound (e.g., a compound of Chemical Formula 1), a compound of Chemical Formula 2 can be obtained in the preparation step of the silica particle surface-treated with the (meth)acrylate compound.

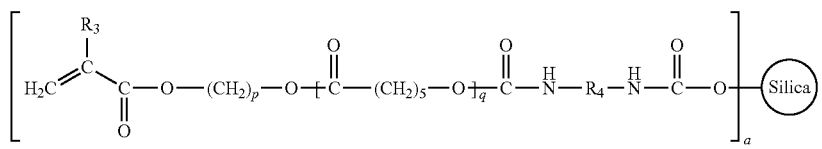

[Chemical Formula 2]

In Chemical Formula 2, $R_3$ is hydrogen or a methyl, $R_4$ is any divalent organic functional group, p is an integer of 1 to 5, q is an integer of 1 to 10, b is an integer of 2 to 9, a is an integer equal to or greater than 1, and "silica" represents a silica particle. As described above, $R_4$ may be a divalent organic functional group derived from the diisocyanate compound, specific examples of which are the same as described above. Preferably, b can be an integer of 3 to 7, and more preferably 5.

"a" is the number of the hydroxyalkyl (meth)acrylates modified with the polylactone compound, which are linked to surface of the silica particle via the urethane linkage, and for example, ranges from 1 to 30.

The production method of the coating film may further include adding a UV-curable monomer to a mixture of a (meth)acrylate binder resin, a UV initiator, an organic solvent, and silica particles surface-treated with a (meth)acrylate compound.

In addition, the production method of the coating film may further include adding one or more additives selected from the group consisting of a leveling agent and a dispersion stabilizer to the mixture.

Details about the UV-curable monomer, the leveling agent, and the dispersion stabilizer are the same as set forth above.

Advantageous Effect of the Invention

According to the present invention, a UV-curable coating composition having high transmittance and a low level of haze, excellent scratch resistance, and superb self-healing capabilities, a coating film using the coating composition, and a production method of the coating film are provided.

Details for Practicing the Invention

The present invention will now be explained in further detail with reference to the following examples. However, these examples are merely illustrative of the present invention, the scope of which shall not be construed to be limited by the following examples.

EXAMPLE 1

A. Preparation of a Dispersion of Silica Particles Surface-Treated with a (meth)acrylate Compound (1) Introduction of Isocyanate (NCO) Groups to the Surface of the Silica Particles After 40 g of toluene diisocyanate (TDI) was diluted with 160 g of methyl ethyl ketone, 200 g of methyl ethyl ketone-silica sol [MEK-ST, a product of Nissan Chemicals Co., Ltd., an average size of the silica particles=22 nm, a silica content=30%, solvent: methyl ethyl ketone] was added thereto. 0.5 g of a tin catalyst, dibutyltin dilaurate (DBTDL), was put into the resulting mixture, which was then stirred at 50° C. for 24 hours.

(2) Introduction of Polycaprolactone-Modified (meth)acrylate 120 g of a polycaprolactone-modified hydroxyalkyl acrylate [Placcel FA-5 from Daicel Co. Ltd.] was added to the resulting solution obtained from the aforementioned stirring, which was then stirred at 60° C. for five hours.

B. Synthesis of a Binder Resin 40 g of an organic isocyanate prepolymer, 60 g of polycaprolactone-modified hydroxy acrylate, 0.1 g of a tin catalyst (i.e., dibutyl tin dilaurate: DBTDL), and 200 g of methyl ethyl ketone were mixed together and stirred at 60° C. for five hours.

A hexamethylene diisocyanate (HDI) trimer, DN980S (from Aekyung Chemicals, Co., Ltd.) was used for the organic isocyanate prepolymer, and 30 g of Placcel FA-2 and 30 g of Placcel FA-5 (from Daicel Co. Ltd., each being different in the number of caprolactone repeating units per moiety) were used for the polycaprolactone-modified hydroxy acrylate. The reaction was confirmed by an FT-IR spectrum.

C. Preparation of Coating Composition 10 wt % of the dispersion of the silica particle being surface-treated with the acrylate as obtained from section A, 50 wt % of the urethane acrylate binder resin as obtained from section B, 11 wt % of PETA, 3 wt % of a UV initiator (Irgacure 184), 1 wt % of leveling agent, and 25 wt % of isopropyl alcohol were mixed to produce a coating composition.

D. Production of Coating Film

The coating composition thus obtained was coated onto a PET film 50 times by using a meyer bar and dried in an oven at 60° C. for two minutes, and was then irradiated with UV rays at 100 mJ/cm$^2$ to produce a coating film.

EXAMPLE 2

A. Preparation of a Dispersion of Silica Particles Surface-Treated with (meth)acrylate Compound (1) Introduction of Isocyanate (NCO) Group to the Surface of the Silica Particles After 40 g of isophorone diisocyanate (IPDI) was diluted with 160 g of methyl ethyl ketone, 200 g of methyl ethyl ketone-silica sol [MEK-ST, a product of Nissan Chemicals CO., Ltd., an average size of the silica particles=22 nm, a silica content=30%, solvent: methyl ethyl ketone] was added thereto. 0.5 g of a tin catalyst, dibutyltin dilaurate (DBTDL), was put into the resulting mixture, which was then stirred at 50° C. for 24 hours.

(2) Introduction of Polycaprolactone-Modified (meth)acrylate 120 g of polycaprolactone-modified hydroxyalkyl acrylate (Placcel FA-5) was added to the resulting solution obtained from the stirring, which was then stirred at 60° C. for five hours.

B. Synthesis of a Binder Resin

A binder resin was prepared in the same manner as set forth in Example 1.

C. Preparation of Coating Composition

A coating composition was prepared in the same manner as set forth in Example 1, except for using 10 wt % of the dispersion of the silica particle surface-treated with acrylate being obtained in section A.

EXAMPLE 3

A. Preparation of a Dispersion of Silica Particles Surface-Treated with (meth)acrylate Compound (1) Introduction of Isocyanate (NCO) Group to the Surface of the Silica Particles After 40 g of isophorone diisocyanate (IPDI) was diluted with 160 g of methyl ethyl ketone, 200 g of methyl ethyl ketone-silica sol [MEK-ST, a product of Nissan Chemicals CO., Ltd., an average size of the silica particles=22 nm, a silica content=30%, solvent: methyl ethyl ketone] was added thereto. 0.5 g of a tin catalyst, dibutyltin dilaurate (DBTDL), was put into the resulting mixture, which was then stirred at 50° C. for 24 hours.

(2) Introduction of Polycaprolactone-Modified (meth) acrylate 60 g of polycaprolactone-modified hydroxyalkyl acrylate (Placcel FA-2) and 60 g of Placcel FA-5 were added to the resulting solution obtained from the stirring, and then the mixture was stirred at 60° C. for five hours.

B. Synthesis of a Binder Resin

A binder resin was prepared in the same manner as set forth in Example 1.

C. Preparation of Coating Composition

A coating composition was prepared in the same manner as set forth in Example 1 except for using 10 wt % of the dispersion of the silica particle surface-treated with acrylate being obtained in section A.

COMPARATIVE EXAMPLE 1

A coating composition was prepared in the same manner as set forth in Example 1, except for using a silica dispersion of MEK-ST instead of the dispersion of the silica particles surface-treated with (meth)acrylate as obtained from section A of Example 1.

In addition, the coating composition thus obtained was coated onto a PET film 50 times by using a meyer bar and dried in an oven at 60° C. for two minutes, and was then irradiated with UV rays at 100 mJ/cm$^2$ to produce a coating film.

EXPERIMENTAL EXAMPLE

Evaluation of the Properties of the Coating Film

Properties of the coating films obtained from the examples and the comparative example were evaluated as follows.

1. optical properties: the light transmittance and the haze were measured by using a haze meter.
2. self-healing capabilities: the surface of the coating film was rubbed with a copper brush and then the extent of recovery from a scratched state was observed with the naked eye.
3. measurement of scratch resistance: After scratches were created with steel wool going back and forth under a certain load, the surface of the coating film was observed with the naked eye.

TABLE 1

Evaluation results for the properties of the coating film

|  | Example 1 | Example 2 | Example 3 | Comp. Example |
|---|---|---|---|---|
| transmittance (%)/haze (%) | 93.3/1 | 93.3/0.9 | 93.3/0.9 | 92.8/2.2 |
| Self-healing capabilities | good | good | good | good |
| Steel wool/ 150 g load | good (no damage) | good (no damage) | good (no damage) | good (no damage) |
| Steel wool/ 200 g load | good (no damage) | good (no damage) | good (no damage) | poor (a lot of marks) |

The results of Table 1 indicate that the coating films of the examples show higher transmittance and a lower haze value than the coating film of the comparative example wherein the silica particle dispersion was used as it was, confirming that they have excellent optical properties. In addition, almost no scratches were found even under a load of 200 g for the coating films of the examples, and this evidences excellent scratch resistance thereof. In contrast, the coating film of the comparative example was found to have many scratches created under a load of 200 g.

What is claimed is:

1. A coating composition comprising a (meth)acrylate binder resin, a UV initiator, an organic solvent, and silica particles having a polylactone-modified hydroxyalkyl (meth)acrylate linked to their surface through a urethane linkage, wherein the silica particles having a polylactone-modified hydroxyalkyl (meth)acrylate linked to their surface through a urethane linkage comprise a compound of Chemical Formula 2:

[Chemical Formula 2]

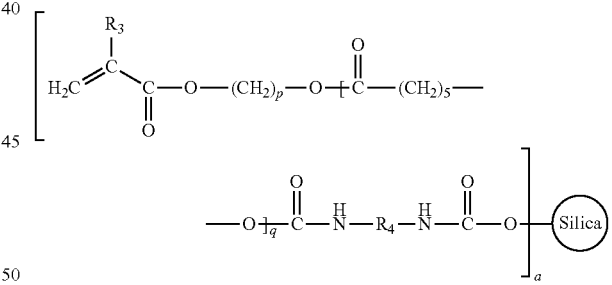

wherein $R_3$ is hydrogen or a methyl, $R_4$ is any divalent organic functional group, p is an integer of 1 to 5, q is an integer of 1 to 10, a is an integer equal to or greater than 1, b is an integer of 2 to 9, and "silica" represents a silica particle.

2. The coating composition in accordance with claim 1, wherein the (meth)acrylate binder resin comprises at least one polymer resin selected from the group consisting of a urethane (meth)acrylate resin and a hydroxyalkyl (meth)acrylate resin modified with a polylactone compound.

3. The coating composition in accordance with claim 2, wherein the hydroxyalkyl (meth)acrylate resin modified with a polylactone compound comprises a compound of Chemical Formula 1:

[Chemical Formula 1]

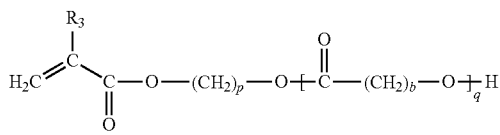

mixing a (meth)acrylate binder resin, a UV initiator, an organic solvent, and a silica particle having a polylactone-modified hydroxyalkyl (meth)acrylate linked to their surface through a urethane linkage;

applying the mixture on a substrate and drying it; and subjecting the dried mixture to UV curing, wherein the silica particles having a polylactone-modified hydroxyalkyl (meth)acrylate linked to their surface through a urethane linkage comprise a compound of Chemical Formula 2:

[Chemical Formula 2]

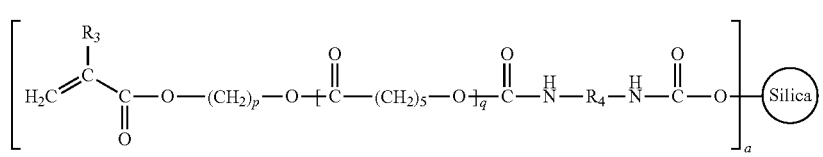

wherein, in Chemical Formula 1, $R_3$ is hydrogen or a methyl, p is an integer of 1 to 5, q is an integer of 1 to 10, and b is an integer of 2 to 9.

4. The coating composition in accordance with claim 2, wherein the urethane (meth)acrylate resin comprises a reaction product between an organic isocyanate compound having at least two isocyanate groups per molecule and a hydroxyalkyl (meth)acrylate modified with a polylactone compound.

5. The coating composition in accordance with claim 1, comprising:
   20% to 80% by weight of the (meth)acrylate binder resin;
   1% to 10% by weight of the UV initiator;
   5% to 50% by weight of the organic solvent; and
   1% to 30% by weight of the silica particles having a polylactone-modified hydroxyalkyl (meth)acrylate linked to their surface through a urethane linkage.

6. The coating composition in accordance with claim 1, further comprising a UV-curable monomer.

7. The coating composition in accordance with claim 6, wherein the UV-curable monomer comprises at least one multifunctional acrylate compound selected from the group consisting of pentaerythritol tri/tetraacrylate (PETA), dipentaerythritol hexa-acrylate (DPHA), trimethylol propane triacrylate (TMPTA), and hexamethylene diacrylate (HDDA).

8. The coating composition in accordance with claim 1, further comprising at least one additive selected from the group consisting of a leveling agent and a dispersion stabilizer.

9. A coating film comprising a cured product of a coating composition of claim 1.

10. The coating film in accordance with claim 9, wherein the (meth)acrylate binder resin and the silica particles having a polylactone-modified hydroxyalkyl (meth)acrylate linked to their surface through a urethane linkage are chemically bonded.

11. The coating film in accordance with claim 9, wherein the (meth)acrylate binder resin and the silica particles having a polylactone-modified hydroxyalkyl (meth)acrylate linked to their surface through a urethane linkage form a crosslinked network structure.

12. The coating film in accordance with claim 9, further comprising a UV-curable monomer.

13. A method of producing a coating film, which comprises the steps of:

wherein $R_3$ is hydrogen or a methyl, $R_4$ is any divalent organic functional group, p is an integer of 1 to 5, q is an integer of 1 to 10, a is an integer equal to or greater than 1, b is an integer of 2 to 9, and "silica" represents a silica particle.

14. The method of producing a coating film in accordance with claim 13, further comprising a step of preparing the (meth)acrylate binder resin.

15. The method of producing a coating film in accordance with claim 14, wherein the step of preparing the (meth)acrylate binder resin comprises triggering a reaction between an organic isocyanate compound having at least two isocyanate groups per molecule and a polylactone-modified hydroxyalkyl (meth)acrylate resin to produce a urethane (meth)acrylate resin.

16. The method of producing a coating film in accordance with claim 13, further comprising a step of preparing the silica particles having a polylactone-modified hydroxyalkyl (meth)acrylate linked to their surface through a urethane linkage.

17. The method of producing a coating film in accordance with claim 16, wherein the step of preparing the silica particles having a polylactone-modified hydroxyalkyl (meth)acrylate linked to their surface through a urethane linkage comprises subjecting silica particles to a reaction with a diisocyanate compound, and subjecting a product resulting from the reaction between the silica particles and the diisocyanate compound to a reaction with a (meth)acrylate compound.

18. The method of producing a coating film in accordance with claim 13, further comprising a step of adding a UV-curable monomer to the mixture.

19. The method of producing a coating film in accordance with claim 13, further comprising a step of adding at least one additive selected from the group consisting of a leveling agent and a dispersion stabilizer to the mixture.

* * * * *

UNITED STATES PATENT AND TRADEMARK OFFICE
CERTIFICATE OF CORRECTION

PATENT NO. : 8,975,308 B2
APPLICATION NO. : 13/990698
DATED : March 10, 2015
INVENTOR(S) : Hye-Min Kim et al.

It is certified that error appears in the above-identified patent and that said Letters Patent is hereby corrected as shown below:

Specification

Columns 3-4, lines 39-48:

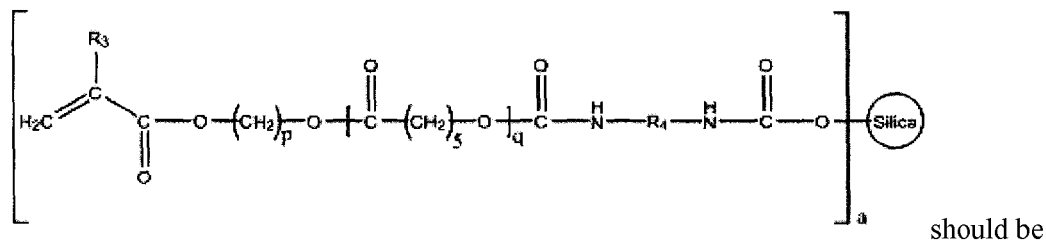

should be

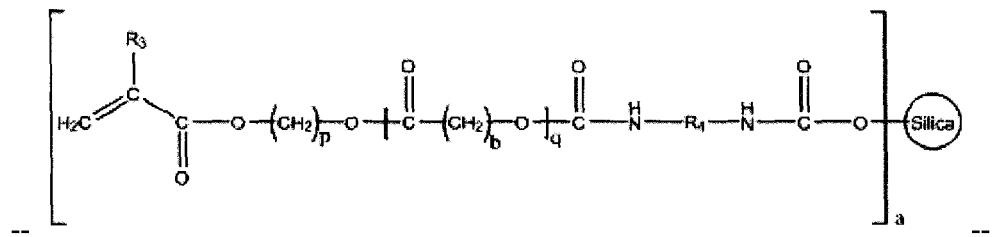

Columns 9-10, lines 1-9:

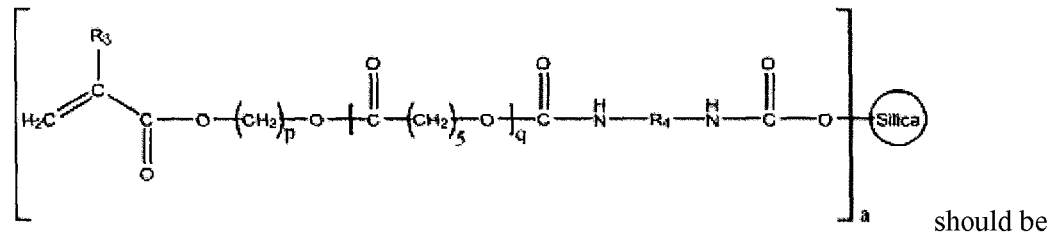

should be

Signed and Sealed this
Twelfth Day of April, 2016

Michelle K. Lee
*Director of the United States Patent and Trademark Office*

CERTIFICATE OF CORRECTION (continued)
U.S. Pat. No. 8,975,308 B2

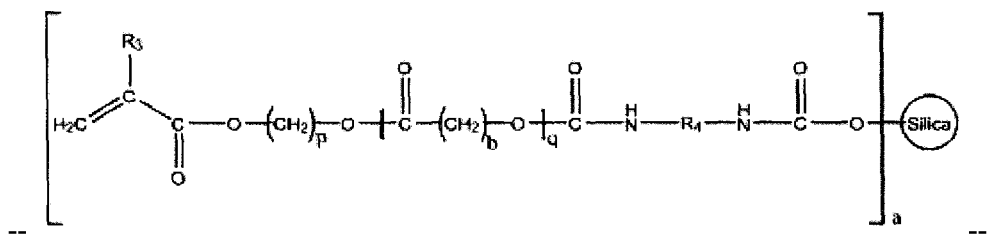

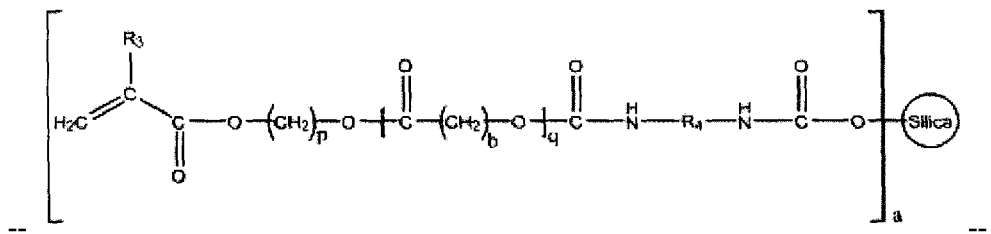

Claims

Claim 1 (column 12, lines 40-50):

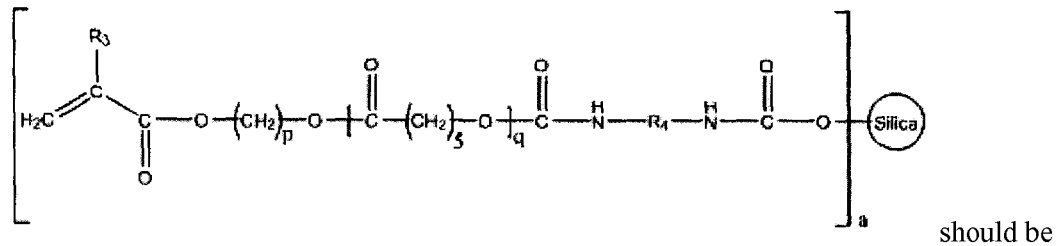

should be

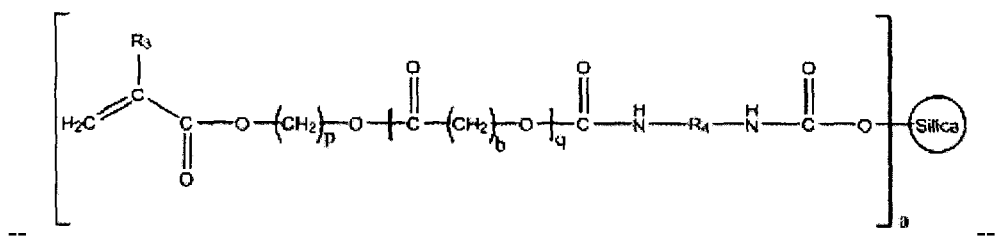

Claim 13 (columns 13-14, lines 11-19):

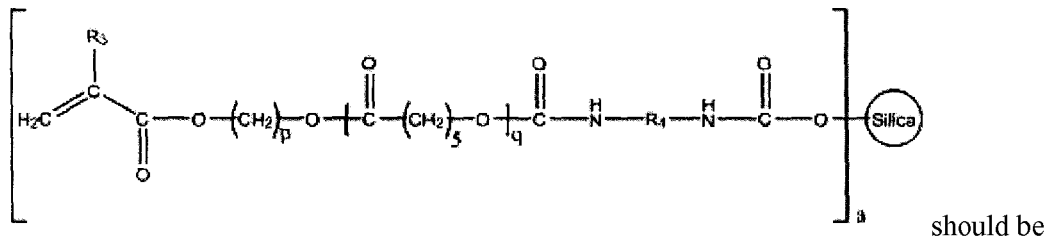

should be